United States Patent
Kuo et al.

(10) Patent No.: US 7,421,717 B2
(45) Date of Patent: Sep. 2, 2008

(54) OPTICAL DISC READING APPARATUS WITH MULTIPLE LOADING/EJECTING APPROACHES

(75) Inventors: Tsung-Jung Kuo, Hsinchu (TW); Jui-Chiang Lin, Hsinchu (TW)

(73) Assignee: Lite-On It Corp., Taipei (TW)

( * ) Notice: Subject to any disclaimer, the term of this patent is extended or adjusted under 35 U.S.C. 154(b) by 565 days.

(21) Appl. No.: 11/097,471

(22) Filed: Apr. 1, 2005

(65) Prior Publication Data

US 2005/0237892 A1    Oct. 27, 2005

(30) Foreign Application Priority Data

Apr. 21, 2004    (TW) .............................. 93111113 A (51) Int. Cl.
*G11B 17/03* (2006.01)
(52) U.S. Cl. .................................................. 720/619
(58) Field of Classification Search ................ 720/601, 720/617, 619, 624; 369/75.11, 75.21, 77.21
See application file for complete search history.

(56) References Cited

U.S. PATENT DOCUMENTS

| | | | | |
|---|---|---|---|---|
| 5,572,399 A | * | 11/1996 | Shirato et al. ............... | 361/680 |
| 5,610,891 A | * | 3/1997 | Choi ........................... | 720/644 |
| 5,768,239 A | * | 6/1998 | Sellers ........................ | 720/653 |
| 6,288,993 B1 | * | 9/2001 | Kawahara et al. ........... | 720/652 |
| RE38,226 E | * | 8/2003 | Sugie et al. .................. | 720/619 |
| 6,919,877 B2 | * | 7/2005 | Hong ........................ | 345/156 |
| 6,952,832 B2 | | 10/2005 | Lee et al. | |
| 7,055,163 B2 | * | 5/2006 | Takahashi et al. ........... | 720/725 |
| 7,225,449 B2 | * | 5/2007 | Pan ............................. | 720/604 |

* cited by examiner

*Primary Examiner*—Allen T Cao
(74) *Attorney, Agent, or Firm*—Kirton & McConkie; Evan R. Witt (57) ABSTRACT

An optical disc reading apparatus includes a main body, a first disc entrance and a second disc entrance. The main body has a disc-reading room therein for accommodating the optical disc. The first disc entrance is arranged on a first face of the main body for providing the optical disc with a first approach to the disc-reading room. The second disc entrance is arranged on a second face of the main body different from the first face for providing the optical disc with a second approach to the disc-reading room.

15 Claims, 8 Drawing Sheets

OPTICAL DISC READING APPARATUS WITH MULTIPLE LOADING/EJECTING APPROACHES

FIELD OF THE INVENTION

The present invention relates to an optical disc reading apparatus, and more particularly to an optical disc reading apparatus with at least two disc loading/ejecting approaches.

BACKGROUND OF THE INVENTION

Optical discs such as compact discs (CDs), video compact discs (VCDs) and digital versatile disc (DVDs) are played via disc drives. When an optical pickup head of an optical disc drive operates, the light emitted by a light source such as a laser diode is focused by an object lens of the optical pickup head on an optical disc, and the light reflected by the optical disc is transmitted to a light sensor to realize information from the disc.

Figure 1A:
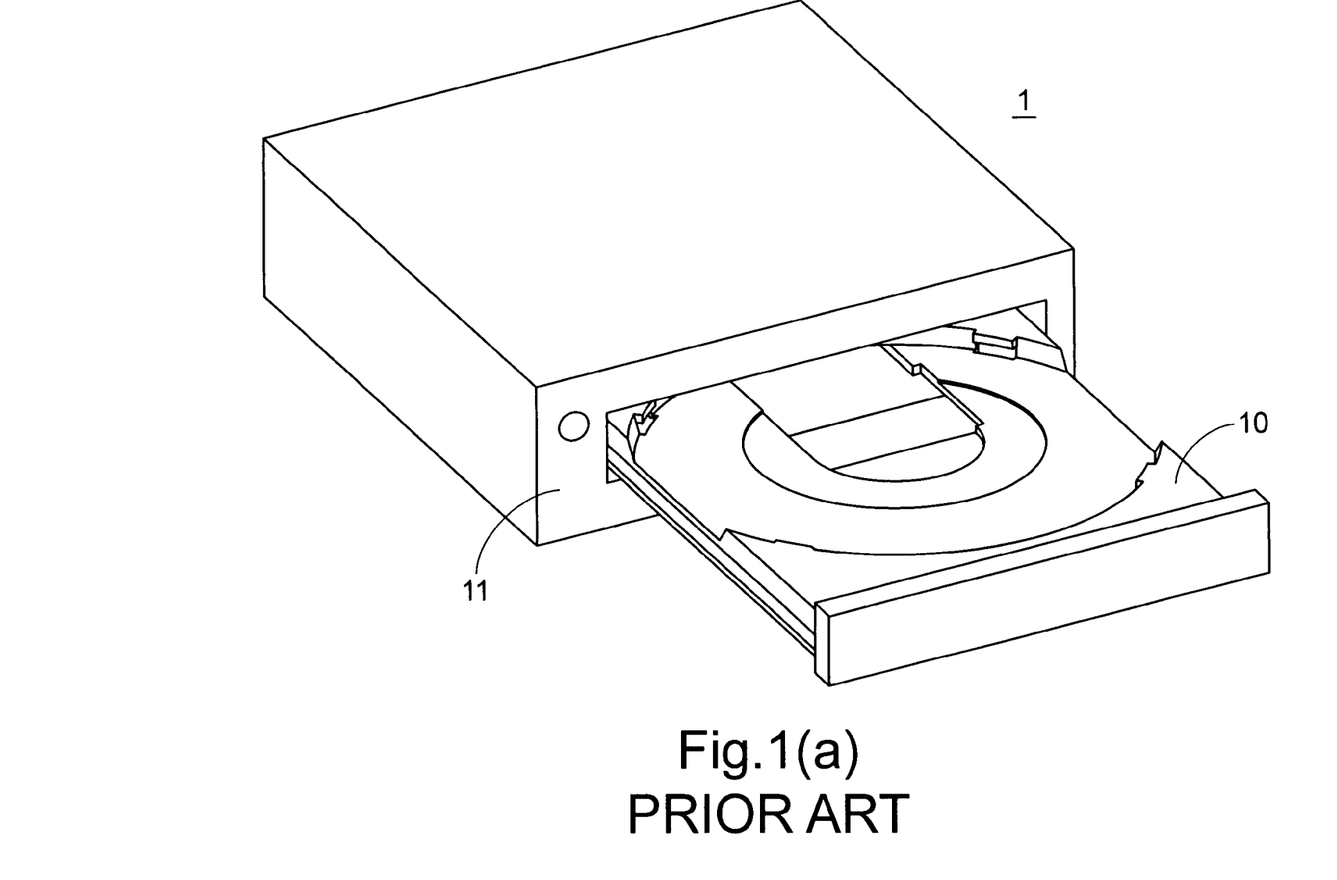
FIG. 1(a) is a perspective diagram schematically illustrating a typical tray-loading mechanism for loading/ejecting an optical disc.
Figure 1B:
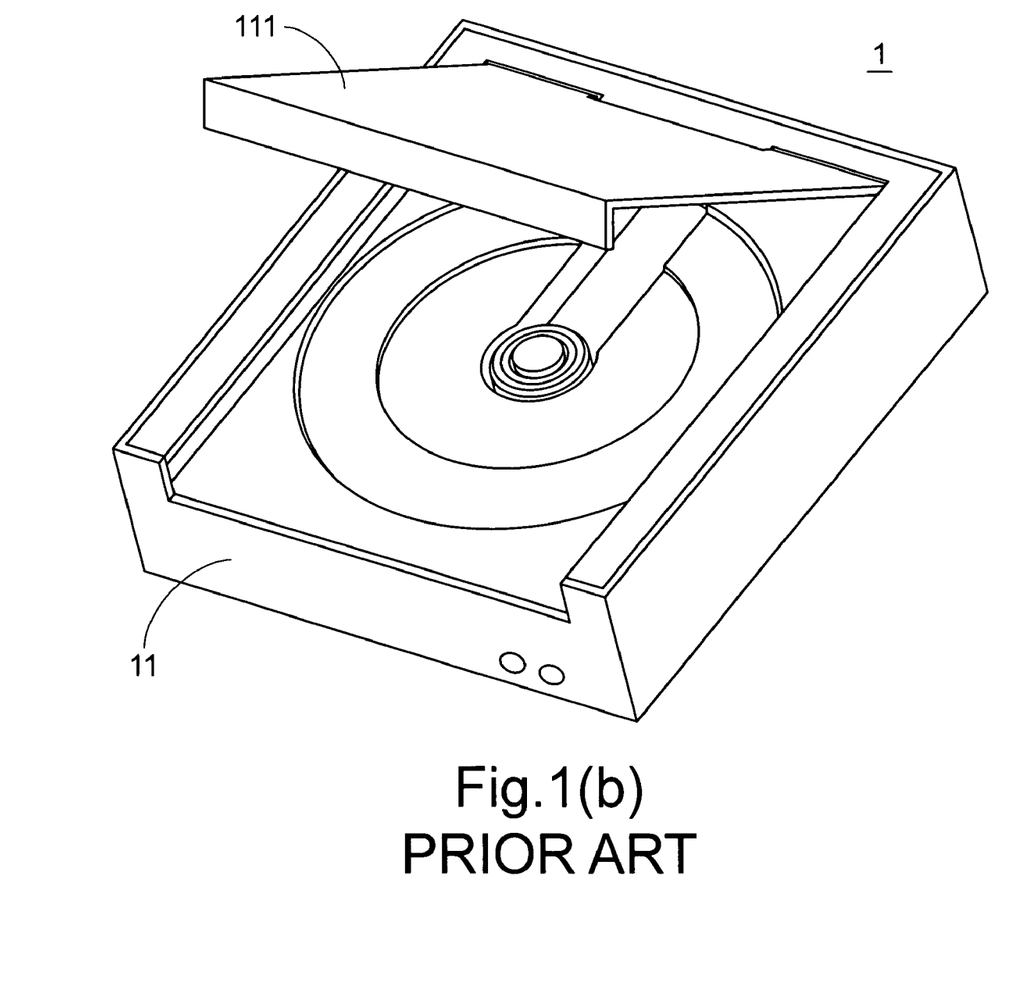
FIG. 1(b) is a perspective diagram schematically illustrating a typical top-loading mechanism for loading/ejecting an optical disc.
Figure 1C:
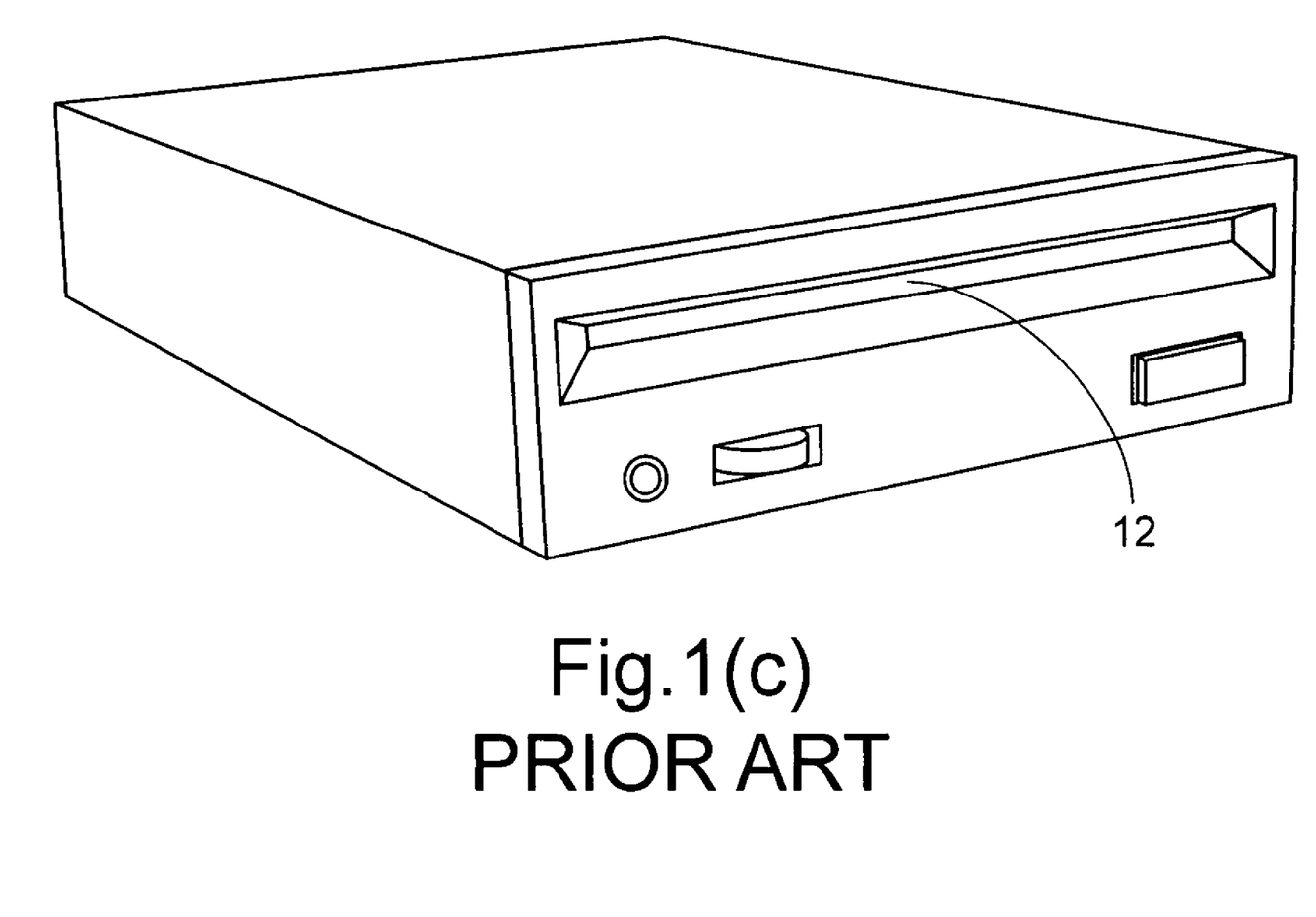
FIG. 1(c) is a perspective diagram schematically illustrating a typical slot-loading mechanism for loading/ejecting an optical disc.

The disc loading/ejecting mechanisms of an optical disc reading apparatus are generally classified as three major types: a tray-loading mechanism, a top-loading mechanism and a slot-loading mechanism, as shown in FIGS. 1(a)~1(c), respectively.

Referring to FIG. 1(a), a tray-loading mechanism is illustrated. For loading an optical disc to be read, a tray 10 is manually pulled out or mechanically transmitted out from the front of the disc drive 1. After the optical disc is positioned in the tray 10, the tray 10 is pushed back inside the disc drive 1 for reading operations. Likewise, when the disc is to be unloaded, the tray 10 extends forwards and out of the housing 11 again to allow the disc to be removed. According to this tray-loading mechanism, it is required to reserve an operative space in front of the disc drive sufficient for the extension of the tray 10 for loading/ejecting the disc.

In the top-loading mechanism of FIG. 1(b), for loading an optical disc to be read, the top lid 111 of the housing 11 is lifted upwards. After the disc is positioned, the top lid 111 is put down to cover the disc and the reading operation can be performed. Likewise, when the disc is to be unloaded, the top lid 111 is lifted upwards again to allow the disc to be removed from the disc drive 1. In this top-loading mechanism, an operative space above the disc drive 1 is required for uplifting the top lid 111 to load/eject the disc.

Referring to FIG. 1(c), a slot-loading mechanism is illustrated. The disc drive 1 has a slot 12 in a front panel thereof for receiving therein a disc. When the disc drive 1 detects that a disc at the entrance of the slot 12, a transmitting mechanism inside the disc drive 1 will automatically transmit the disc inwards. Since the disc is front-loaded, an operative space in front of the disc drive is still needed for loading/ejecting the disc, which is similar to the case of FIG. 1(a).

In views of the spatial restriction, the above disc loading mechanisms need further improvement.

SUMMARY OF THE INVENTION

Therefore, the present invention provides an optical disc reading apparatus with at least two approaches for loading/ejecting an optical disc so as to alleviate the spatial restriction.

In accordance with a first aspect of the present invention, there is provided an optical disc reading apparatus for reading an optical disc. The optical disc reading apparatus comprises a main body, a first disc entrance and a second disc entrance. The main body has a disc-reading room therein for accommodating the optical disc. The first disc entrance is arranged on a first face of the main body for providing the optical disc with a first approach to the disc-reading room. The second disc entrance is arranged on a second face of the main body different from the first face for providing the optical disc with a second approach to the disc-reading room.

In an embodiment, the optical disc reading apparatus further comprises a disc tray movably mounted in the main body and optionally exposed as the first disc entrance for carrying the optical disc to the disc-reading room via the first approach.

In an embodiment, the first face is a front face of the main body, and the tray optionally extends from the front face to receive the optical disc. The movement of the tray is actuated with a push button disposed on the main body.

In an embodiment, the optical disc reading apparatus further comprises a lid movably mounted to the main body and optionally moved to directly expose the disc-reading room as the second disc entrance for loading the optical disc to the disc-reading room via the second approach.

In an embodiment, the second face is a top face of the main body, and the lid is pivotally mounted to the top face and optionally uplifted to expose the disc-reading room. The uplifting of the lid is actuated with a push button disposed on the main body.

In an embodiment, the optical disc reading apparatus further comprises a braking device optionally enabled to stop rotation of the optical disc that is loaded in the disc-reading room and rotating to be read. The braking device is a switch shorted-circuited to permit rotation of the optical disc when the lid covers the disc-reading room and open-circuited to stop rotation of the optical disc when the lid is moved to expose the disc-reading room.

Preferably, the optical disc reading apparatus is a slim type, a half-height type, an external type or a domestic type of optical disc reading apparatus.

Preferably, the optical disc reading apparatus is a CR-ROM drive, a DVD-ROM drive, a CD-RW drive, a COMBO drive or a DVD+R/–R drive.

In accordance with a second aspect of the present invention, there is provided a disc loading mechanism for use in an optical disc reading apparatus. The disc loading mechanism comprises a main body, a disc tray and a top lid. The main body has a disc-reading room therein for accommodating the optical disc. The disc tray is extensible from a front face of the main body for carrying an optical disc into or out of the disc-reading room. The top lid pivotal about a hinge on a top face of the main body for exposing the disc-reading room for loading/unloading an optical disc or covering the disc-reading room.

In an embodiment, the disc tray is optionally exposed as a first disc entrance for carrying the optical disc to the disc-reading room via a first approach. Besides, the top lid is optionally moved to directly expose the disc-reading room as a second disc entrance for loading the optical disc to the disc-reading room via a second approach.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2A:
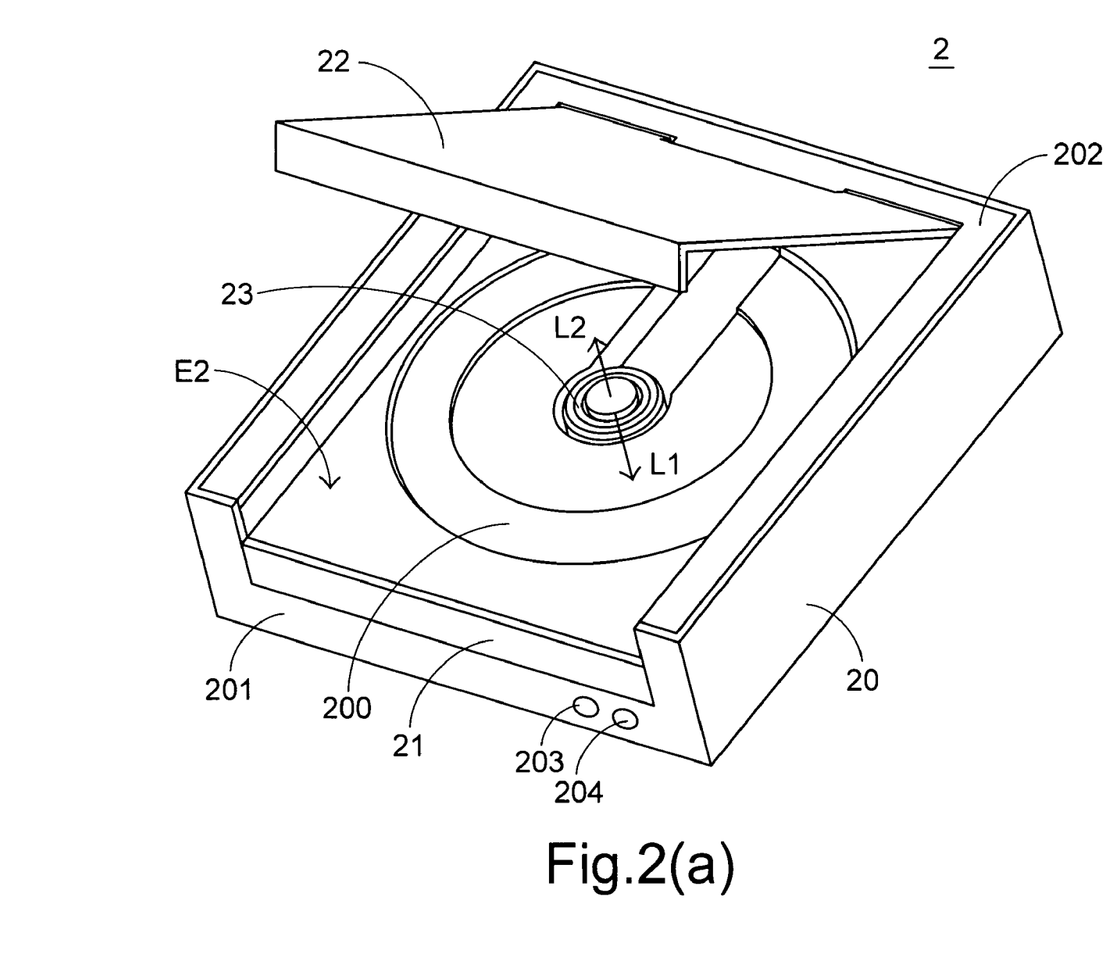
FIGS. 2(a) and 2(b) are perspective diagrams schematically illustrating two loading/ejecting options of an optical disc reading apparatus according to an embodiment of the present invention.
Figure 2B:
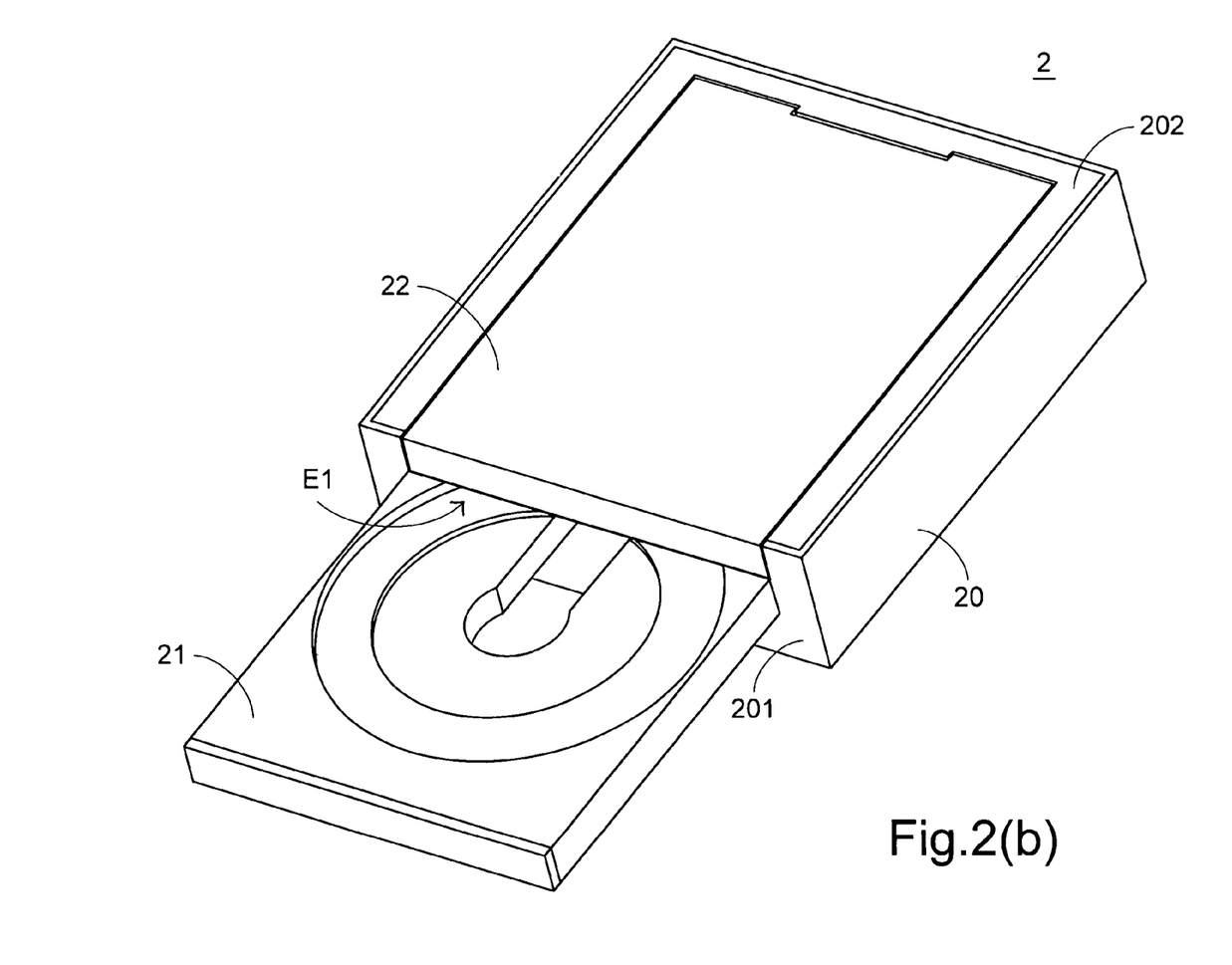

Referring to FIGS. 2(a) and 2(b), an optical disc reading apparatus according to a preferred embodiment of the present invention is illustrated. The optical disc reading apparatus, for example a disc drive 2, comprises a main body 20, a disc tray 21, a top lid 22 and a turntable 23. The main body 20 has a disc-reading room 200 for accommodating therein an optical disc to be read. The disc tray 21 is movably mounted in the main body 20 and serving as a first disc entrance E1 when it is moved out and exposed for receiving the disc. The top lid 22 is pivotally mounted to the top face 202 of the main body 20 and serving as a second disc entrance E2 when it is uplifted to expose the disc-reading room 200. The disc can thus be directly put into the disc-reading room 200.

The disc drive 2 of this embodiment provides two approaches for loading/ejecting the optical disc, i.e. a top-loading mechanism and a tray-loading mechanism which are shown in FIGS. 2(a) and 2(b), respectively. The first approach is to feed an optical disc into the disc drive with the tray-loading mechanism. The tray-loading mechanism is suitable when the operative space in front of the disc drive 2 is sufficient for the extension of the disc tray 21 for loading/ejecting the optical disc. For example, in order to load the optical disc, a push button 203 disposed on the front surface 201 of the main body 20 or any other suitable position is pressed down to actuate the downward movement L1 of the turntable 23, and then the disc tray 21 is transmissible forwards and out from the main body 20, thereby exposing the first disc entrance E1. After the optical disc has been positioned in the disc tray 21, the disc tray 21 is pushed back inside the main body 20, and the turntable 23 moves in the upward direction L2 to hold the optical disc. In contrast, the top-loading mechanism is suitable when the operative space above the disc drive 2 enough for accommodating the uplifted top lid 22 is existent. For loading the optical disc, another push button 204 disposed on the front surface 201 of the main body 20 or any other suitable position is pressed down to actuate the uplifting action of the top lid 22, thereby exposing the first disc entrance E2. After the optical disc has been placed from the top and positioned in the disc-reading room 200, the top lid 22 is pivoted down to cover the optical disc and then the reading operation can be performed.

Since the tray-loading mechanism or the top-loading mechanism can be alternatives of each other when there is no sufficient operative space above or in front of the disc drive 2, the flexibility of using the disc drive 2 is enhanced. In addition, if one of these two disc loading/ejecting mechanisms has a breakdown, the other can still function for disc loading/ejecting.

Figure 3A:
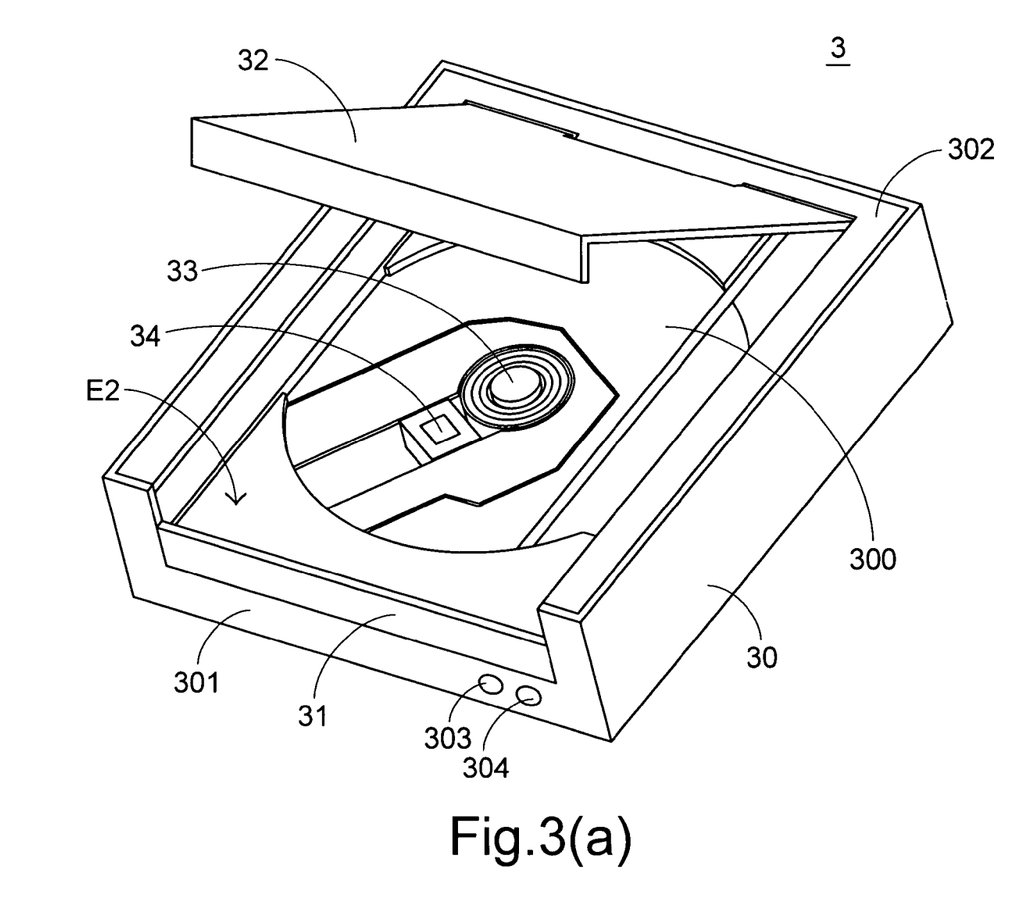
FIGS. 3(a) and 3(b) are perspective diagrams schematically illustrating two loading/ejecting operations of an optical disc reading apparatus according to another embodiment of the present invention.
Figure 3B:
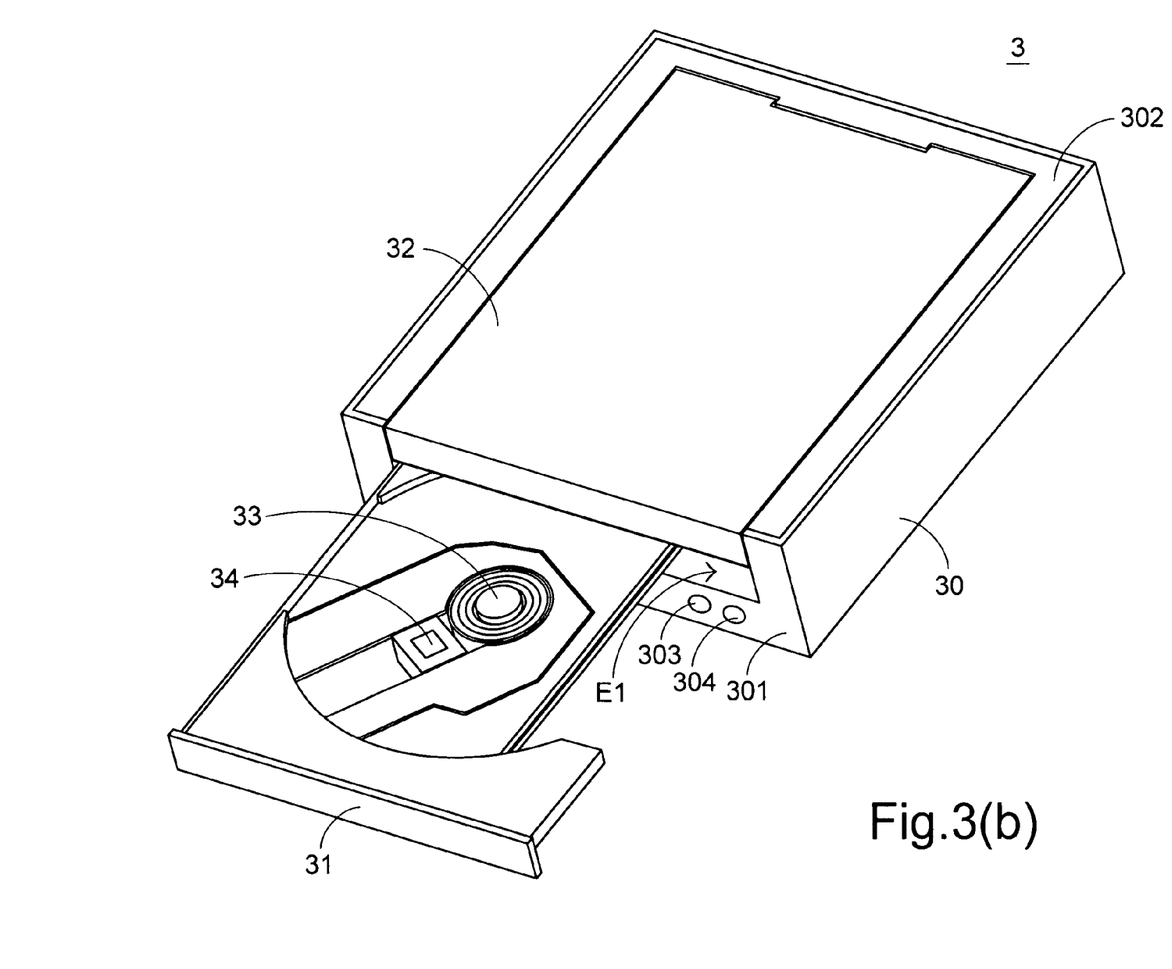

A further embodiment of an optical disc reading apparatus is illustrated in FIGS. 3(a) and 3(b). The optical disc reading apparatus is a slim-type disc drive 3 and comprises a main body 30, a disc tray 31 and a top lid 32. A turntable 33 and an optical pickup head 34 are integrated into the disc tray 31. The main body 30 has a disc-reading room 300 for accommodating therein an optical disc to be read. The disc tray 31 is movably mounted in the main body 30 and optionally exposed as a first disc entrance E1. The top lid 32 is pivotally mounted to the top face 302 and optionally uplifted directly to expose the disc-reading room 300 as a second disc entrance E2. For example, when a tray-loading mechanism is selected for loading the optical disc, a push button 303 disposed on the main body 30 is pressed down, and the disc tray 31 is transmitted out from the front face 301 of the main body 30. After the optical disc has been positioned in the disc tray 31, the disc tray 31 is pushed back inside the main body 30 to complete the first approach for feeding the optical disc. When the top-loading mechanism is selected for loading the optical disc in the second approach, another push button 304 disposed on the main body 30 is pressed down to actuate the uplifting action of the top lid 32, thereby exposing the second disc entrance E2 accessible to the disc-reading room 300. After the optical disc has been positioned in the disc tray 31 from the second disc entrance E2, the top lid 32 is put down to cover the optical disc and the reading operation can be performed.

Figure 4:
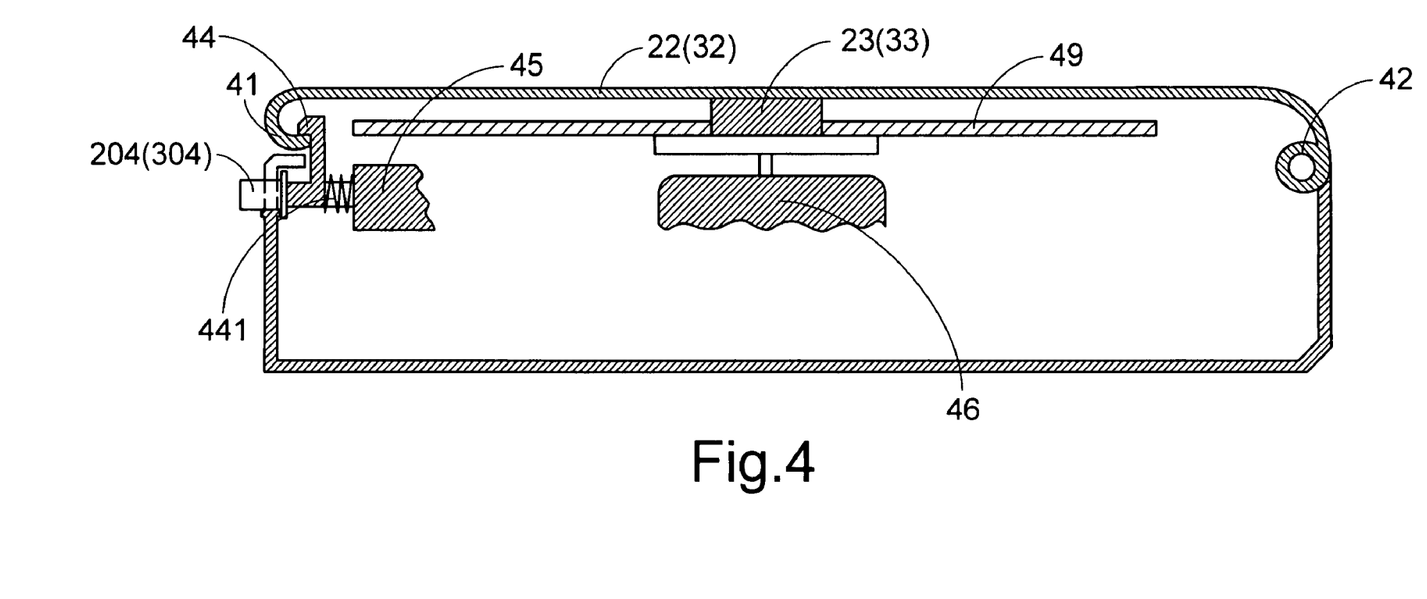
FIG. 4 is a schematic cross-sectional diagram illustrating an embodiment of the top-loading mechanism of the optical disc reading apparatus as shown in FIG. 2(a) or 3(a).

For further understanding the top-loading mechanism used in the optical disc reading apparatus of the present invention, the operating principle will be illustrated as follows in more details with reference to FIG. 4. As shown, the top lid 22 or 32 is pivotal about a hinge 42. When the top lid 22 or 32 is put down to cover the optical disc 49 loaded in the disc drive, the front edge 41 of the top lid 22 or 32 is hooked by a hook structure 44. Then, a switch 45 coupled to the hook structure 44 is electronically connected the motor 46 and short-circuited so as to permit rotation of the optical disc 49 fixed on the turntable 23 or 33. The reading operation can thus be executed. During the reading operation, if a push button 204 or 304 disposed on the main body is pressed down, the hook structure 44 will be transmitted inwards and release the front edge 41 of the top lid 41 so as to uplift the top lid 22 or 32. Meanwhile, the switch 45 becomes open-circuited due to the movement of the hook structure 44 coupled thereto. Accordingly, the motor 46 and thus the rotating shaft 23 or 33 are stopped when the top lid 22 or 32 is opened, thereby avoiding the damage of the device. Further, a compression spring 441 is disposed behind the hook structure 44 to facilitate the restoring of the push button 204 or 304. Preferably, another torsion spring (not shown) sheathes around the hinge 42 to provide a torsional force to facilitate the uplift action of the top lid 22 or 32.

From the above description, it is understood that the optical disc reading apparatus of the present invention is flexible in disc loading/ejecting manners depending on the practical spatial situation or the user's preference. The present invention can be applied to any optical disc reading apparatus such as a CR-ROM drive, a DVD-ROM drive, a CD-RW drive, a COMBO drive and a DVD+R/−R drive. In addition, the type of such optical disc reading apparatus may be designed according to the market's demand. For example, the optical disc reading apparatus may be a slim type, a half-height type, an external type or a domestic type of optical disc reading apparatus.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical disc reading apparatus for reading an optical disc, said optical disc reading apparatus comprising:
   a main body having a disc-reading room therein for accommodating said optical disc;
   a first disc entrance arranged on a first face of said main body for providing said optical disc with a first approach to said disc-reading room;
   a second disc entrance arranged on a second face of said main body different from said first face for providing said optical disc with a second approach to said disc-reading room; and
   a disc tray movably mounted in said main body and optionally exposed from said first disc entrance for carrying said optical disc to said disc-reading room via said first approach.

2. The optical disc reading apparatus according to claim 1 wherein said first face is a front face of said main body, and said tray optionally extends from said front face to receive said optical disc.

3. The optical disc reading apparatus according to claim 2 wherein the movement of said tray is actuated with a push button on said main body.

4. The optical disc reading apparatus according to claim 1 further comprising a lid movably mounted to said main body and optionally moved to directly expose said disc-reading room as said second disc entrance for loading said optical disc to said disc-reading room via said second approach.

5. The optical disc reading apparatus according to claim 4 wherein said second face is a top face of said main body, and said lid is pivotally mounted to said top face and optionally uplifted to expose said disc-reading room.

6. The optical disc reading apparatus according to claim 4 further comprising a braking device optionally enabled to stop rotation of said optical disc that is loaded in said disc-reading room.

7. The optical disc reading apparatus according to claim 4 further comprising a braking device optionally enabled to stop rotation of said optical disc that is loaded in said disc-reading room.

8. The optical disc reading apparatus according to claim 7 wherein said braking device is a switch short-circuited to permit rotation of said optical disc when said lid covers said disc-reading room and open-circuited to stop rotation of said optical disc when said lid is moved to expose said disc-reading room.

9. The optical disc reading apparatus according to claim 1 being a slim type, a half-height type, an external type or a domestic type of optical disc reading apparatus.

10. The optical disc reading apparatus according to claim 1 being selected from a group consisting of a CR-ROM drive, a DVD-ROM drive, a CD-RW drive, a COMBO drive and a DVD+R/−R drive.

11. A disc loading mechanism for use in an optical disc reading apparatus, comprising:
    a main body having a disc-reading room therein for accommodating said optical disc upon reading;
    a disc tray extensible from a front face of said main body for carrying an optical disc into or out of said disc-reading room; and
    a top lid pivotal about a hinge on a top face of said main body for exposing said disc-reading room for loading/unloading an optical disc or covering said disc-reading room.

12. The disc loading mechanism according to claim 11 wherein said disc tray is optionally exposed as a first disc entrance for carrying said optical disc to said disc-reading room via a first approach.

13. The disc loading mechanism according to claim 11 wherein said top lid is optionally moved to directly expose said disc-reading room as a second disc entrance for loading said optical disc to said disc-reading room via a second approach.

14. The disc loading mechanism according to claim 13 further comprising a braking device optionally enabled to stop rotation of said optical disc that is loaded in said disc-reading room and rotating to be read.

15. The disc loading mechanism according to claim 14 wherein said braking device is a switch short-circuited to permit rotation of said optical disc when said top lid covers said disc-reading room and open-circuited to stop rotation of said optical disc when said top lid is moved to expose said disc-reading room.

* * * * *